(12) United States Patent
Tomisawa et al.

(10) Patent No.: US 7,317,472 B2
(45) Date of Patent: Jan. 8, 2008

(54) DISPLAY APPARATUS

(75) Inventors: Isao Tomisawa, Tsurugashima (JP);
Satoshi Sugiura, Tsurugashima (JP);
Taro Nakajima, Tsurugashima (JP);
Takehisa Okuyama, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 923 days.

(21) Appl. No.: 10/736,071

(22) Filed: Dec. 16, 2003

(65) Prior Publication Data

US 2004/0125202 A1    Jul. 1, 2004

(30) Foreign Application Priority Data

Dec. 17, 2002    (JP)    ............................. P2002-365449

(51) Int. Cl.
*H04N 7/14*    (2006.01)

(52) U.S. Cl. .................................................. 348/14.07

(58) Field of Classification Search .................. 348/61, 348/63, 14.07, 151, 211, 212, 56, 51, 756, 348/744, 42; 345/6, 7, 4, 32, 424, 5, 419, 345/422, 427, 431, 433, 439, 434, 136, 137, 345/8, 9, 611, 614, 1.1, 1.2, 88, 102, 83, 87, 345/92, 97; 359/462, 633, 290; 349/113, 349/114

See application file for complete search history.

(56) References Cited

FOREIGN PATENT DOCUMENTS

JP    2000-115812 A    4/2000

*Primary Examiner*—Tung Vo
*Assistant Examiner*—Behrooz Senfi
(74) *Attorney, Agent, or Firm*—Sughrue Mion, PLLC

(57) ABSTRACT

A display apparatus is provided with a plurality of display device, at least one of which is a semitransparent display; and a fixing device for fixing the plurality of display devices to be placed along a front-rear direction on a viewer's line of sight each other, wherein a relationship between the spacing L(mm) between image planes of adjacent of the plurality of display devices and the length S(mm) of diagonal lines of the two display devices satisfies a predetermined condition.

15 Claims, 8 Drawing Sheets

FIG. 4

| SCREEN SIZE (INCH TYPE) | LENGTH S OF DIAGONAL LINE (MILLIMETERS) | LOWER LIMIT VALUE (MILLIMETERS) | RECOMMENDED LOWER LIMIT VALUE (MILLIMETERS) | RECOMMENDED VALUE (MILLIMETERS) | RECOMMENDED UPPER LIMIT VALUE (MILLIMETERS) | UPPER LIMIT VALUE (MILLIMETERS) |
|---|---|---|---|---|---|---|
| 1 | 25.4 | 1.80 | 2.50 | 4.50 | 6.50 | 9.00 |
| 2 | 50.8 | 2.30 | 3.00 | 5.50 | 8.00 | 11.00 |
| 3 | 76.2 | 2.70 | 3.50 | 6.50 | 9.50 | 13.00 |
| 4 | 101.6 | 3.10 | 4.00 | 7.50 | 11.00 | 15.00 |
| 5 | 127.0 | 3.50 | 4.50 | 8.50 | 12.50 | 17.00 |
| 6 | 152.4 | 3.90 | 5.00 | 9.50 | 14.00 | 19.00 |
| 7 | 177.8 | 4.30 | 5.50 | 10.50 | 15.50 | 21.00 |
| 8 | 203.2 | 4.70 | 6.00 | 11.50 | 17.00 | 23.00 |
| 9 | 228.6 | 5.10 | 6.50 | 12.50 | 18.50 | 25.00 |
| 10 | 254.0 | 5.50 | 7.00 | 13.50 | 20.00 | 27.00 |
| 11 | 279.4 | 5.90 | 7.50 | 14.50 | 21.50 | 29.00 |
| 12 | 304.8 | 6.30 | 8.00 | 15.50 | 23.00 | 31.00 |
| 13 | 330.2 | 6.70 | 8.50 | 16.50 | 24.50 | 33.00 |
| 14 | 355.6 | 7.10 | 9.00 | 17.50 | 26.00 | 35.00 |
| 15 | 381.0 | 7.50 | 9.50 | 18.50 | 27.50 | 37.00 |
| 16 | 406.4 | 7.90 | 10.00 | 19.50 | 29.00 | 39.00 |
| 17 | 431.8 | 8.30 | 10.50 | 20.50 | 30.50 | 41.00 |
| 18 | 457.2 | 8.70 | 11.00 | 21.50 | 32.00 | 43.00 |
| 19 | 482.6 | 9.10 | 11.50 | 22.50 | 33.50 | 45.00 |
| 20 | 508.0 | 9.50 | 12.00 | 23.50 | 35.00 | 47.00 |

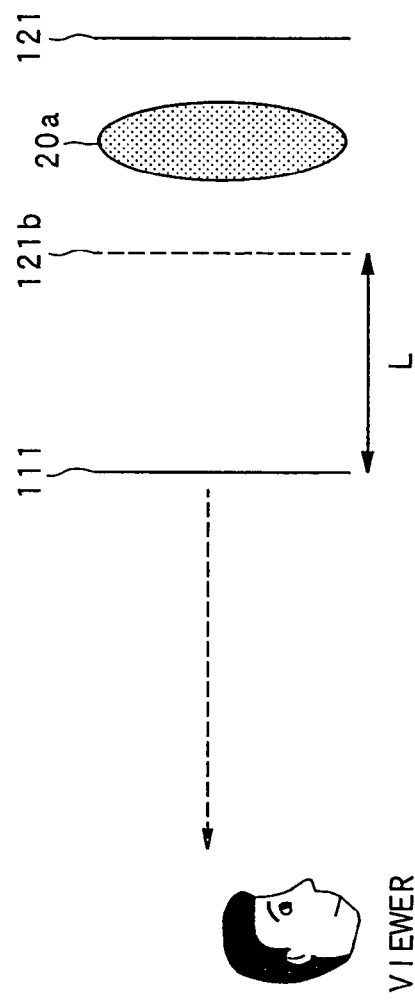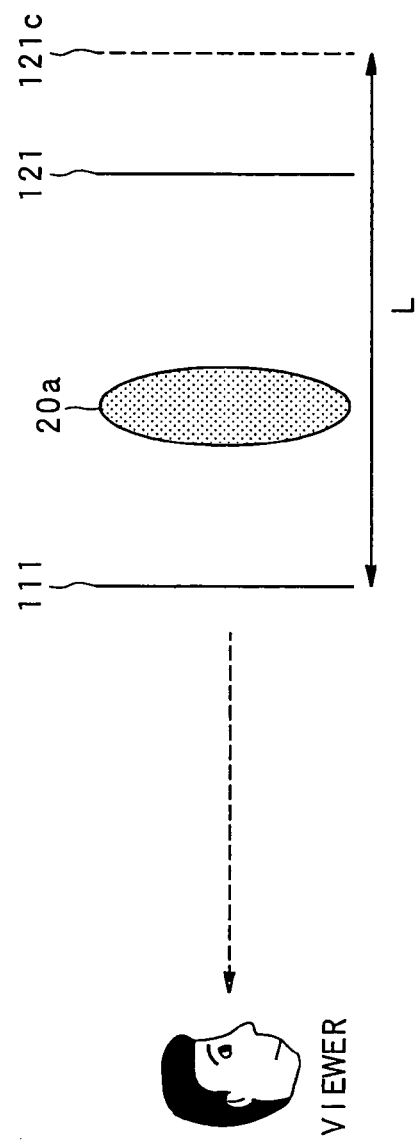

DISPLAY APPARATUS

BACKGROUND OF THE INVENTION

1. Field of the Invention

The present invention relates to a display apparatus in which a plurality of display device are placed along a front-rear direction corresponding to a viewer's line of sight and which enables three-dimensional viewing of an image by controlling a corresponding image displayed on each display device.

2. Description of the Related Art

Display apparatuses in various forms have been proposed as an apparatus capable of displaying an image having a three-dimensional appearance or such apparatuses have been put to practical use. For example, a liquid crystal shutter spectacles system or the like is well known as a display apparatus capable of displaying an electrically-rewritable image having a three-dimensional appearance. In this liquid crystal shutter spectacles system, pictures of an object are taken in different directions by a camera, image data including parallax information thereby obtained is synthesized into one image signal, and this signal is input to a display device to display images. A viewer wears liquid crystal shutter spectacles. At the times of display of odd fields for example, the liquid crystal shutter corresponding to the right eye is set in a transmitting state while the liquid crystal shutter corresponding to the left eye is set in a light shielding state. On the other hand, at the times of display of even fields, the liquid crystal shutter corresponding to the left eye is set in a transmitting state while the liquid crystal shutter corresponding to the right eye is set in a light shielding state. Images for the right eye and images for the left eye are displayed in the odd fields and in the even fields, respectively, in synchronization with each other. The viewer can recognize an image having a three-dimensional appearance by viewing with the right and left eyes the images for the right and left eyes including a parallax.

A display apparatus is also known in which a plurality of display devices are placed in a front-rear direction on a viewer's line of sight and the viewer views images displayed on the display devices in a state of being superposed on each other as seen from the viewer. These images are discrete in the depth direction but perceivable as an image having a three-dimensional appearance. Another display apparatus is also known which is designed to improve the above-described discrete state in such a manner that the luminances of images respectively displayed on the display devices are changed relative to each other so that the resulting image can be perceived as if the object exists at an intermediate position between the discrete positions. This display apparatus can display an image improved in three-dimensional appearance. For example, a luminance modulation type of display apparatus which displays object images from a plurality of display devices in a superposed state by using a plurality of half mirrors to enable such a display that a semitransparent object is displayed or an object at the back of a foreground object is seen through the foreground object is proposed (see, for example, Patent Document 1).

[Patent Document 1]

Japanese Patent Laid-Open No. 2000-115812

The display apparatus having a plurality of display devices placed in a front-rear direction on a viewer's line of sight has a technical problem in that whether or not an image having a three-dimensional appearance can be easily displayed or whether such an image can be displayed or cannot be displayed depends on the spacing between the display devices.

SUMMARY OF THE INVENTION

In view of the above-described inconvenience, an object of the present invention is to provide a display apparatus which uses an arrangement having a plurality of display devices placed along a front-rear direction, and which enables a viewer to perceive an image having a three-dimensional appearance.

The above object of the present invention can be achieved by a display apparatus of the present invention. The display apparatus is provided with a plurality of display device, at least one of which is a semitransparent display; and a fixing device for fixing the plurality of display devices to be placed along a front-rear direction on a viewer's line of sight each other, wherein a relationship between the spacing L(mm) between image planes of adjacent of the plurality of display devices and the length S(mm) of diagonal lines of the two display devices satisfies a condition expression:

$$S/63.5+1.5 \leq L \leq S/12.7+7.0$$

In one aspect of the present invention can be achieved by the display apparatus of the present invention. The display apparatus of the present invention is, wherein the relationship between the spacing L(mm) and the length S(mm) satisfies a condition expression:

$$S/50.8+2.0 \leq L \leq (3 \times S)/50.8+5.0$$

In another aspect of the present invention can be achieved by the display apparatus of the present invention. The display apparatus of the present invention is, wherein the relationship between the spacing L(mm) and the length S(mm) satisfies a condition expression:

$$L=S/25.4+3.5$$

In further aspect of the present invention can be achieved by the display apparatus of the present invention. The display apparatus of the present invention is, wherein the spacing L is the spacing between light emitting surfaces of the two display devices.

In further aspect of the present invention can be achieved by the display apparatus of the present invention. The display apparatus of the present invention is further provided with an imaging device for imaging the image plane of at least one of said two display devices at a predetermined position not located on the screen of said at least one of said two display devices.

In further aspect of the present invention can be achieved by the display apparatus of the present invention. The display apparatus of the present invention is, wherein at least one of the imaging device is provided with a lens.

In further aspect of the present invention can be achieved by the display apparatus of the present invention. The display apparatus of the present invention is, wherein the lens is provided in correspondence with each of pixels of the two display devices or with each of pixel blocks or pixel lines formed by a plurality of pixels.

In further aspect of the present invention can be achieved by the display apparatus of the present invention. The display apparatus of the present invention is, wherein the spacing L is an air-conversion optical path length between the two display devices.

In further aspect of the present invention can be achieved by the display apparatus of the present invention. The display apparatus of the present invention is, further provided with an optical path length changing device for changing the optical path length.

In further aspect of the present invention can be achieved by the display apparatus of the present invention. The display apparatus of the present invention is, wherein the optical path length changing device is provided with a transparent member having a predetermined refractive index.

In further aspect of the present invention can be achieved by the display apparatus of the present invention. The display apparatus of the present invention is, wherein the transparent member is constituted by at least one of glass or a resin.

In further aspect of the present invention can be achieved by the display apparatus of the present invention. The display apparatus of the present invention is, wherein one of the two display devices is a display device combined by a half mirror, and the spacing L is the difference between the length of an optical path for light transmitted through the half mirror to reach the other of the two display devices and the length of an optical path for light reflected by the half mirror to reach said one of the two display devices.

In further aspect of the present invention can be achieved by the display apparatus of the present invention. The display apparatus of the present invention is, wherein the sizes of the screens of the two display devices are equal to each other.

In further aspect of the present invention can be achieved by the display apparatus of the present invention. The display apparatus of the present invention is, wherein each of the display device except at least the one remotest from the viewer is formed by semitransparent display device.

In further aspect of the present invention can be achieved by the display apparatus of the present invention. The display apparatus of the present invention is, wherein the semitransparent display device is provided with a liquid crystal display device or an electro-luminescent display device.

According to the present invention, the viewer can perceive an image having a most or highly suitable three-dimensional appearance.

The functions and advantages of the present invention will become apparent from the following description of modes of implementation of the present invention.

BRIEF DESCRIPTION OF THE DRAWINGS

FIG. 4 is a table showing the relationship between the length S and the spacing L in the display apparatus in the embodiment of the present invention;

FIG. 7A is a diagram schematically showing the spacing L in other arrangement of the image display units in the embodiment of the present invention;

FIG. 7B is a diagram schematically showing the spacing L in other arrangement of the image display units in the embodiment of the present invention;

DETAILED DESCRIPTION OF THE PREFERRED EMBODIMENTS

Figure 1:
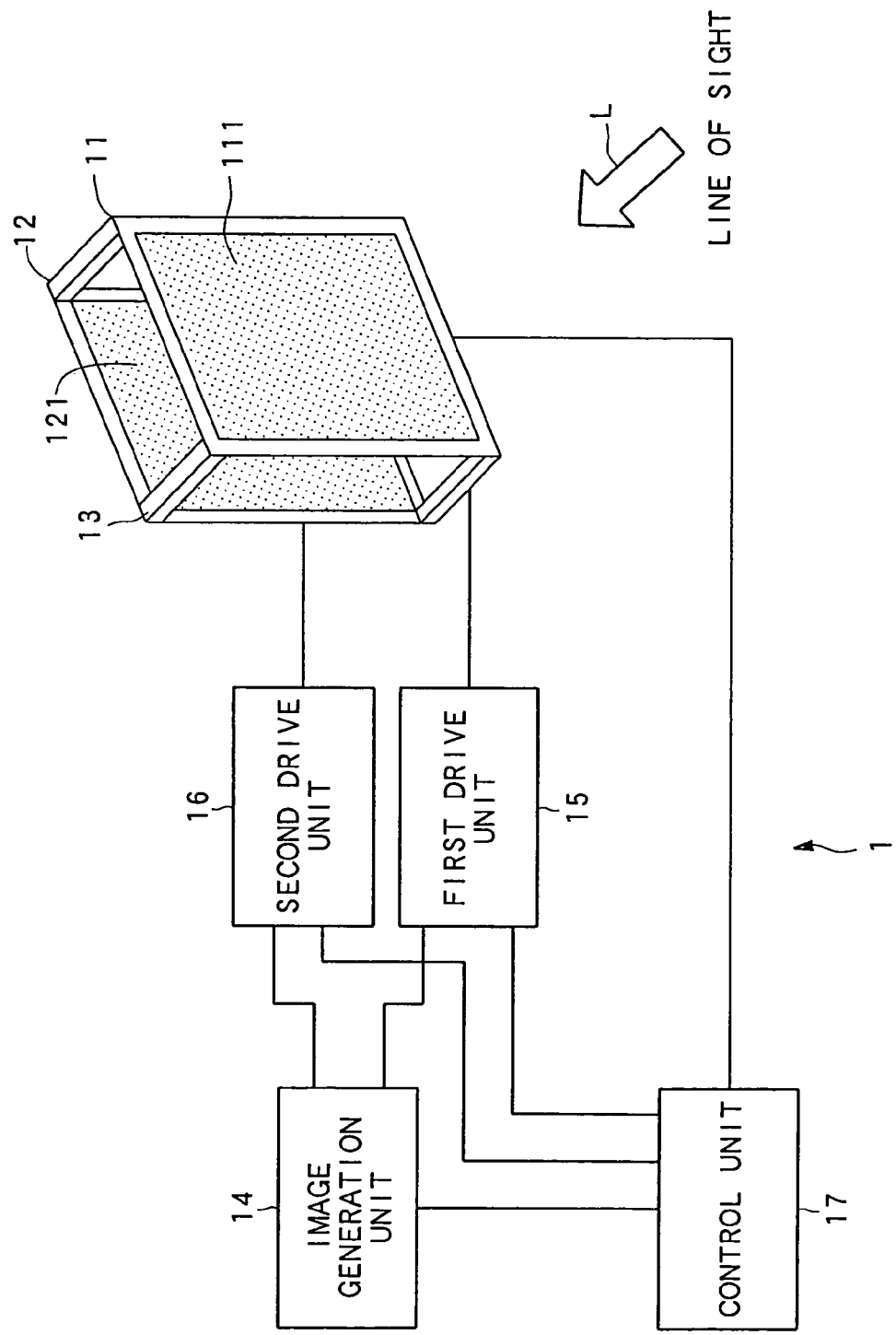
FIG. 1 is a block diagram showing the construction of a display apparatus which represents an embodiment of the present invention.

Modes of implementation of the present invention is described below.

One embodiment of a display apparatus in present invention is provided with a plurality of display devices, at least one of which is a semitransparent display; and a fixing device for fixing the plurality of display devices to be placed along a front-rear direction on a viewer's line of sight each other, wherein a relationship between the spacing L(mm) between image planes of adjacent of the plurality of display devices and the length S(mm) of diagonal lines of the two display devices satisfies a condition expression:

$$S/63.5+1.5 \leq L \leq S/12.7+7.0$$

In the display apparatus according to the mode of implementation of the present invention, the plurality of display device is provided with, for example, a cathode ray tube (CRT) display device, a plasma display device, an electro-luminescent (EL) display device or a liquid crystal display device are fixed by the fixing device is provided with a fixing device, e.g., a stopper, bolts or the like. The plurality of display device are thereby placed along the front-rear direction on the viewer's line of sight so as to satisfy the condition expression (1).

If the plurality of display device display images for three-dimensional display in a superposed state as seen from the viewer side when the display apparatus operates, three-dimensional display can be performed. That is, the viewer can perceive an image having a three-dimensional appearance. For example, in the case of luminance-modulation three-dimensional display, alternating luminance activation of the adjacent two display device (hereinafter referred to as "two display device" as occasion demands) is performed by luminance allocation with respect to corresponding image portions displayed by the display device to achieve continuous three-dimensional display such that an image appears to exist at a position in the depth direction between the two display device, or discrete three-dimensional display such that each of image portions is displayed on one of the two display device. Further, continuous or discrete display such that an image appears to exist at a position between three or more display device can also be performed. In such a case, if the viewer views one of the display device, for example, through a lens, a half mirror, a transparent member having a predetermined refractive index, or the like, the image plane of the display device recognized by the viewer (i.e., the image plane of the light emitting surface of the display device) is imaged at a predetermined position different from the position at which the display device is actually fixed. If the viewer views the display device not through any lens, any half mirror, any transparent member having a predetermined refractive index, or the like, the image plane recognized by the viewer is the same as the light emitting surface of the display device.

In the display apparatus having the above-described plurality of display device, there is a possibility of difficulty in displaying a three-dimensional image or failure to display a three-dimensional-image, depending on the spacing between the image planes of the plurality of display device recognized by the viewer. For example, as the spacing between the two image planes of the adjacent two display device in the plurality of display device (hereinafter referred to as "adjacent two image planes" as occasion demands) is reduced, the spacing between two image planes becomes smaller in comparison with the distance between the viewer and the display apparatus. Therefore, in a case where the two image planes are imaged with a spacing smaller than a certain spacing, the viewer perceives an image lacking in depth or having a weak three-dimensional appearance.

In this mode of implementation in particular, the plurality of display device are fixed by the fixing device in such positions that the condition expression (1) is satisfied to image the two image planes with a spacing equal to or larger than the minimum spacing (i.e., the lower limit value) in a range of spacing in which an image having a three-dimensional appearance can be displayed, thereby enabling the viewer to perceive an image having a three-dimensional appearance.

Conversely, if the two image planes are imaged with a spacing larger than a certain value, image portions displayed at ends of the image planes in particular cannot be displayed in a superposed state on the viewer's line of sight. That is, the viewer views the three-dimensional display images on the two image planes with a misalignment between the images. In such a situation, it is difficult or impossible for the viewer to perceive an image having a three-dimensional appearance.

In this mode of implementation in particular, the plurality of display device are fixed by the fixing device in such positions that the condition expression (1) is satisfied to image the two image planes with a spacing equal to or smaller than the maximum spacing (i.e., the upper limit value) in the range of spacing in which an image having a three-dimensional appearance can be displayed, thereby enabling the viewer to perceive an image having a three-dimensional appearance.

More specifically, if the length of diagonal lines of the two display device is S millimeters, the upper limit value of the spacing between the two image planes is S/12.7+7.0 millimeters, and the lower limit value is S/63.5+1.5 millimeters. That is, if the two display device are fixed in such positions that a state in which the spacing between the two image planes is equal to or smaller than S/12.7+7.0 millimeters is realized, and that a state in which the spacing between the two image planes is equal to or larger than S/63.5+1.5 millimeters is realized, the viewer can perceive an image having a three-dimensional appearance.

The "length of the diagonal line of the display device" is, for example, the distance between the upper left and lower right corners of the screen of the display device (or the distance between the upper right and lower left corners of the screen) if the display device is rectangular, which distance is expressed in millimeters. In a case where the shape of the display device is not rectangular, a rectangular shape approximated to the shape of the display device (e.g., a rectangular shape of the same area as that of the area of the screen of the display device, of a rectangular shape having a contour similar to the contour of the screen) may be used and the length of a diagonal line of such a shape may be used as S.

Even in a case where the display apparatus has three or more display device, each adjacent pair of display device are fixed in such positions as to satisfy the above-described condition expression (1) to enable the viewer to perceive an image having a three-dimensional appearance.

In this mode of implementation, any three-dimensional display method other than the luminance modulation method may be used as a three-dimensional display method. Even in such a case, the plurality of display device may be fixed in such positions as to satisfy the above-described condition expression (1) to enable the viewer to perceive an image having a three-dimensional appearance.

Another embodiment of a display apparatus in the present invention is, wherein the relationship between the spacing L(mm) and the length S(mm) satisfies a condition expression:

$$S/50.8+2.0 \leq L \leq (3 \times S)/50.8+5.0$$

According to this mode of implementation, the two display device are fixed in a state of having a predetermined spacing such that the two image planes are imaged with a spacing satisfying the condition expression (2) by which the range defined by the condition expression (1) is further reduced, thereby enabling an image to be displayed in a more suitably superposed state, as seen from the viewer. The viewer can perceive an image with an improved feeling of depth in comparison with the case where the two image planes are imaged with a spacing close to the lower limit value of the condition expression (1), or the viewer can perceive an image having a three-dimensional appearance without recognizing a misalignment between the two image planes in comparison with the case where the two image planes are imaged with a spacing close to the upper limit value of the condition expression (1).

More specifically, with respect to a variable representing the length S of the diagonal lines of the two display device, a recommended upper limit value of the spacing between the two image planes is $3 \times S/50.8+5.0$ millimeters and a recommended lower limit value is $S/50.8+2.0$ millimeters. That is, the two display device are fixed in such positions that a state in which the spacing between the two image planes is equal to or smaller than $3 \times S/50.8+5.0$ millimeters is realized, and that a state in which the spacing between the two image planes is equal to or larger than $S/50.8+2.0$ millimeters is realized, thereby enabling the viewer to perceive an image having a three-dimensional appearance appropriately.

Other embodiment of a display apparatus in the present invention is, wherein the relationship between the spacing L(mm) and the length S(mm) satisfies a condition expression:

$$L=S/25.4+3.5$$

According to this mode of implementation, the two display device are fixed with a predetermined spacing set between them, such that the two image planes are imaged so as to satisfy the condition expression (3) which further reduces the range in accordance with the condition expression (1) and by which a value suitable or most suitable for display of an image having a three-dimensional appearance (i.e., a recommended value) is given, thereby enabling the viewer to perceive an image having a further improved three-dimensional appearance. That is, the two display device are fixed in such positions that the two image planes are imaged with a spacing given as the recommended value to enable the viewer to perceive an image having a three-dimensional appearance without recognizing a misalignment between the two image planes in comparison with the case where the two image planes are imaged with a spacing larger than the recommended value, and to enable the viewer to perceive a three-dimensional image improved in terms of feeling of depth (i.e., an image having a three-dimensional appearance) in comparison with the case where the two image planes are imaged with a spacing smaller than the recommended value.

More specifically, with respect to the variable representing the length S of the diagonal lines of the two display device, the two display device are fixed in such positions that a state in which the spacing between the two image planes is equal to the recommended value S/25.4+3.5 millimeter is realized, thereby enabling the viewer to perceive an image having a most or highly suitable three-dimensional appearance. The symbol "=" in the condition expression (3) shown above, indicating equality according to its essential sense, also signifies that a difference from the recommended value such that the resulting visual difference cannot be recognized by the viewer is allowed. That is, substantially the same result depending on the resolution or discrimination on the basis of visual sensation may suffice.

Further embodiment of a display apparatus in the present invention is, wherein the spacing L is the spacing between light emitting surfaces of the two display devices.

According to this mode of implementation, the two display device can be fixed by being positioned with reference to the light emitting surfaces of the two display device so that the condition expression (1), (2) or (3) is satisfied, while no consideration is given to components held by the display device, the size of the frame, etc.

In a further mode of implementation of the present invention, imaging device of imaging the image plane of at least one of the above-described two display device at a predetermined position not located on the one display device is further provided.

According to this mode of implementation, the imaging device is provided with, for example, a lens or the like is placed between the two display device or between the viewer and one of the two display device. At least one of the two image planes is visually recognized by the viewer through the imaging device. That is, the image plane recognized by the viewer through the imaging device is imaged at the predetermined position different from the position at which the display device is actually fixed. Therefore, it is possible to image the two image planes with the desired spacing by using the imaging device to adjust the position at which the corresponding image plane is imaged.

Thus, the two image planes are imaged with a spacing suitable for three-dimensional display set and adjusted between them, thereby enabling the viewer to perceive an image having a three-dimensional appearance.

In some cases, the two display device cannot be fixed by setting the spacing specified by the condition expression (1), (2) or (3), for example, due to some restriction on the specifications of the structure of the display apparatus. For example, a case is possible in which while it is required that the actual spacing between the two display device be increased to satisfy the condition expression (3), the desired increase in spacing cannot be achieved due to a need to reduce the size of the apparatus. Even in such a case, in the display apparatus of the present invention, the position at which at least one of the image planes can be adjusted by the imaging device. Therefore, the spacing between the two image planes can be increased without increasing the actual spacing between the two image display device. Thus, the plurality of display device can be fixed in such positions as to satisfy the condition expression (1), (2) or (3) optically or as seen from the viewer side.

Further embodiment of a display apparatus of the present invention is, wherein at least one of the imaging device is provided with a lens.

In this arrangement, since the imaging device is provided with a lens, the position at which the image plane of at least one of the two display device is imaged can be changed according to the focal length of the lens. Thus, the two image planes can be imaged comparatively easily with the desired spacing by adjusting the focal length of the lens.

For example, as this lens, any of various lenses, e.g., a convex lens, a concave lens, an aspherical lens, a Fresnel lens, a micro-lens array, and a variable-focus lens such as a liquid crystal lens can be used. A suitable or most suitable lens can be selected according to modes and conditions of use of the apparatus (e.g., a need for a reduction in size, and a requirement in specifications). Thus, the degree of design freedom is improved.

The lens is provided in correspondence with each of pixels of the two display devices or with each of pixel blocks or pixel lines formed by a plurality of pixels.

In this arrangement, one lens is provided in correspondence with each of a plurality of pixels, pixel blocks or pixel lines of the plurality of display device to ensure that all the pixels can be made uniform in brightness and in degree of imaging and an image uniform as a whole can be displayed.

Moreover, in the display apparatus in this mode of implementation, the two display device are fixed in such positions that the two image planes are imaged with a suitable or most suitable spacing set between them, thereby enabling display of an image having a further preferable three-dimensional appearance.

Further, since a lens corresponding to each of pixel blocks or pixel lines can be used, the construction of the lens array can be simplified.

In other implementation of the present invention, the spacing L is an air-conversion optical path length between the two display devices.

According to this mode of implementation, the spacing between the two image planes is computed as an air-conversion optical path length between the light emitting surfaces of the two display device. The "air-conversion optical path length" is a virtual optical path length determined with reference to the corresponding optical path length in air, for example, in such a manner that in a case where the space between the light emitting surfaces of the two display device is filled with a medium having a refractive index different from that of air, the medium is replaced with air. If this value is LA, the air-conversion optical path length is expressed by LA=1/n (where 1 is the actual spacing between the light emitting surfaces of the two display device, and n is the relative refractive index of the medium relative to that of air). Therefore, the two image planes are imaged with the same spacing as the air-conversion optical path length between the light emitting surfaces of the two display device.

Since the spacing L between the two image planes in the expressions (1), (2) and (3) is the air-conversion optical path length LA between the light emitting surfaces of the two display device, LA=L is established. That is, 1/n=L is established. Therefore, the actual spacing 1 between the light emitting surfaces of the two display device can be computed by 1=L×n. Consequently, the spacing with which the two display device are actually fixed can be computed comparatively easily by considering the computed spacing 1, the thickness of the display device, the positions of the light emitting surfaces of the display device, and so on.

Thus, from the spacing L between the two image planes computed by the condition expression (1), (2) or (3) (e.g., the recommended value) and the refractive index n of the optical path changing device placed between the display device, the actual spacing of the two display device (i.e., the spacing with which the two display device are to be fixed) can be derived comparative easily.

This mode of implementation is further provided with an optical path length changing device for changing the optical path length.

According to this mode of implementation, the optical path length between the two display device can be changed by using the optical path length changing device is provided with, for example, a transparent member having a predetermined refractive index or a total reflecting mirror suitably placed.

For example, in a case where one of the two display device is recognized by the viewer through a transparent member having a predetermined refractive index, the air-conversion optical path length between the two display device is reduced or increased according to the refractive index of the transparent member. Therefore, the image plane of the display device visually recognized by the viewer through the transparent member having a predetermined refractive index can be imaged in front or at the rear of the display device as seen from the viewer side.

Alternatively, one of the two display device may be recognized by the viewer via a total reflecting mirror suitably placed to change the optical path by reflecting so that the optical path length is increased. In such a case, the air-conversion optical path length is increased by an amount corresponding to the amount by which the optical path is extended. Therefore, the image plane of the display device visually recognized by the viewer via the total reflecting mirror can be imaged at a position displaced rearward or so as to be remoter as seen from the viewer side by the distance of the extension of the optical path.

Thus, the spacing between the two image planes is adjusted to enable imaging with a spacing suitable for three-dimensional display.

Further, in some cases, the two display device cannot be fixed by setting the spacing specified by the condition expression (1), (2) or (3), for example, due to some restriction on the specifications of the structure of the display apparatus. For example, a case is possible in which while it is required that the actual spacing between the two display device be increased to satisfy the condition expression (3), the desired increase in spacing cannot be achieved due to a need to reduce the size of the apparatus. Even in such a case, in the display apparatus of the present invention, the position at which the spacing between the image planes can be increased by the optical path changing device without increasing the actual spacing between the two display device is possible. Therefore, the spacing between the two image planes can be increased by the optical path length changing device without increasing the actual spacing between the two image display device. Thus, the plurality of display device can be fixed in such positions as to satisfy the condition expression (1), (2) or (3) optically or as seen from the viewer side.

In abovementioned implementation, the optical path length changing device is provided with a transparent member having a predetermined refractive index.

In this arrangement, the optical path length changing device is provided with a transparent member having a predetermined refractive index is placed so as to relatively change the air-conversion optical path length between the two display device to a predetermined value, thereby enabling display described below.

In a case where one of the two display device is visually recognized by the viewer through a member or a medium having a lower refractive index or through vacuum, the air-conversion optical path length between the two display device is increased. Thus, the image plane of the display device visually recognized by the viewer through a transparent member or the like having a refractive index lower than that of air can be imaged at a position displaced rearward or so as to be remoter as seen from the viewer side.

In a case where one of the two display device is visually recognized by the viewer through a transparent member is provided with glass or a resin having a refractive index higher than that of air, the air-conversion optical path length between the two display device is reduced. Thus, the image plane of the display device visually recognized by the viewer through the transparent member having a refractive index higher than that of air can be imaged in front or as to be closer to the viewer side.

The transparent member is constituted by at least one of glass or a resin.

In this arrangement, light is transmitted through the transparent member is provided with glass or a resin. In this manner, the air-conversion optical path length between the two display device can be relatively reduced comparatively easily.

In a further mode of implementation of the display apparatus of the present invention, one of the above-described two display device is a display device combined by a half mirror, and the spacing L is the difference between the length of an optical path for light transmitted through the half mirror to reach the other of the two display device and the length of an optical path for light reflected by the half mirror to reach the above-mentioned one of the two display device.

According to this mode of implementation, the two display device are not directly placed on the viewer's line of sight but images are combined by device of the half mirror. Therefore, a device incapable of transmitting light can be used as the display device. For example, a CRT display device or a plasma display device can be used.

Further, the arrangement is such that light from one of the two display device is reflected by the half mirror and thereafter perceived by the viewer, while light from the other display device is transmitted through the half mirror and thereafter perceived by the viewer. In this case, the spacing between the two image planes is computed from the difference between the length of the optical path for the light transmitted through the half mirror and the length of the optical path for the like reflected by the half mirror. The two display device are fixed in such positions as to satisfy the condition expression (1), (2) or (3), thereby enabling the viewer to perceive an image having a three-dimensional appearance.

In a further mode of implementation of the display apparatus of the present invention, the screen sizes of the two display device are equal to each other.

According to this mode of implementation, the display device having screen sizes equal to each other are used to enable the viewer to perceive an image having a three-dimensional appearance. The display apparatus in accordance with this mode of implementation can be formed by using a plurality of the same display device. Therefore, the display apparatus in accordance with this mode of implementation can be mass-produced by mass-producing the display device having only one screen size, and manufacturing lines can be combined or the manufacturing process can be simplified in comparison with the case of mass-producing a display apparatus having a plurality of display device differing in screen size. Thus, this arrangement has significant advantages in terms of the manufacturing cost, term, etc., required for manufacturing the display device.

Even in a case where the screen sizes of the two display device are not equal to each other, for example, the screen size of one of the display device placed in front as seen from the viewer side is larger or smaller than that of the other display device placed at the rear as seen from the viewer side, the viewer can perceive an image having a three-dimensional appearance.

In a further mode of implementation of the display apparatus of the present invention, each of the display device except at least the one remotest from the viewer is formed by semitransparent display device.

According to this mode of implementation, an image existing at the rear of the display device placed in front can be seen through this display device, and the display device can be directly placed on the viewer's line of sight.

In other implementation, the semitransparent display device is provided with a liquid crystal display device or an EL display device.

According to this mode of implementation, an image having a three-dimensional appearance can be displayed comparatively easily by using display device in the form of a semitransparent panel such as a liquid crystal display device or an EL display device.

The functions and other advantages of these modes of implementation will become apparent from the following description of an embodiment of the present invention.

(Embodiments)

A display apparatus which represents an embodiment of the present invention will be described with reference to the drawings.

(The Basic Construction and the Principle of Operation of Display Apparatus)

Figure 2B:
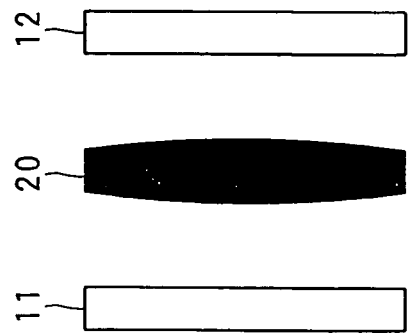
FIG. 2B is a diagram schematically showing other arrangement of the image display units of the display apparatus in the embodiment of the present invention.
Figure 2C:
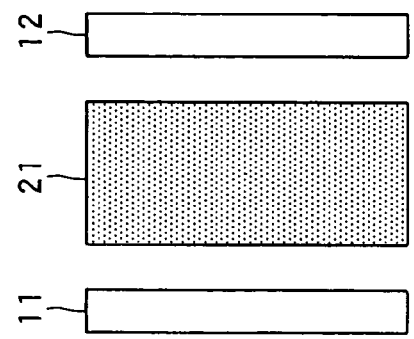
FIG. 2C is a diagram schematically showing other arrangement of the image display units of the display apparatus in the embodiment of the present invention.
Figure 2A:
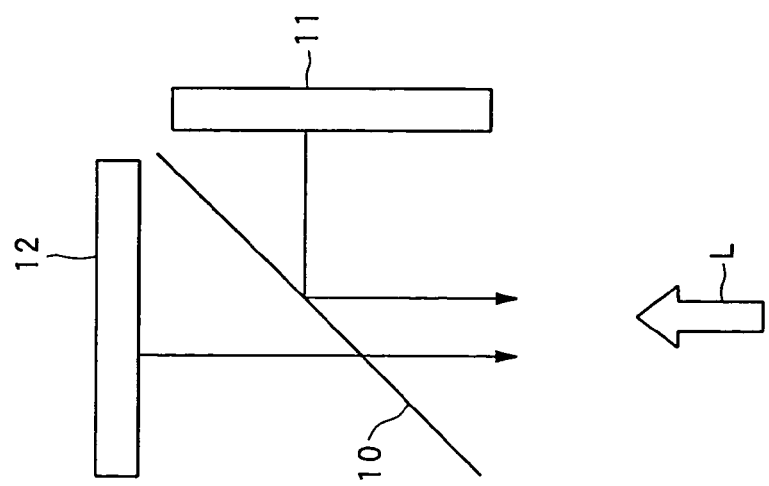
FIG. 2A is a diagram schematically showing other arrangement of the image display units of the display apparatus in the embodiment of the present invention.

The basic construction and the principle of operation of a display apparatus which represents an embodiment of the present invention will be described with reference to FIGS. 1 and 2. FIG. 1 is a block diagram showing the construction of a display apparatus which represents an embodiment of the present invention. FIG. 2A is a diagram schematically showing a display unit arrangement in the display apparatus. FIG. 2B is a diagram schematically showing an arrangement in which an imaging unit 20 is included in the display apparatus. FIG. 2C is a diagram schematically showing an arrangement in which an optical path length setting unit 21 is included in the display apparatus.

As shown in FIG. 1, the display apparatus 1 has a first display unit 11, a second display unit 12 placed at the rear of the first display unit 11, a fixing unit 13 connecting the first and second display units 11 and 12 to each other, an image generation unit 14 which generates images to be displayed on the first and second display units 11 and 12, a first drive unit 15 which displays an image on the first display unit 11 on the basis of an image signal from the image generation unit 14, a second drive unit 16 which displays an image on the second display unit 12 on the basis of an image signal from the image generation unit 14, and a control unit 17 which performs overall control of the display apparatus 1.

The first and second display units 11 and 12 form an image display unit of the display apparatus 1. The first and second display units 11 and 12 are placed along a front-rear direction corresponding to a line of sight L from a viewer, with a predetermined spacing set between them. The first display unit 11 includes a first light emitting portion 111 from which light is actually emitted, and the second display unit 12 includes a second light emitting portion 121 from which light is actually emitted. The first display unit 11 is placed in a front position (i.e., at the front side as seen from the viewer), while the second display unit 12 having the same screen size as the first display unit 11 is placed in a rear position (i.e., at the remote side as seen from the viewer). As the first display unit 11, a light-transmitting display device, e.g., a liquid crystal display device or an EL display device is used to enable the viewer to perceive through the first display unit 11 an image on the second display unit 12 positioned at the rear of the first display unit 11. The second display unit 12 may be a liquid crystal display device or an EL display device. Since it is necessary for the second display unit 12 to have a light-transmitting characteristic, a cathode ray tube (CRT) display device or a plasma display device may be used as the second display unit 12.

Images are respectively formed on the first and second display units 11 and 12 to enable the viewer to recognize an image having a three dimensional appearance, although the image is discrete. Further, an image having a three dimensional appearance and perceivable as if the image exists between the first and second display units 11 and 12 can be displayed by changing the luminances of the images on the first and second display units 11 and 12.

An arrangement in which a CRT display device or a plasma display device through which light cannot pass is used as the first display unit 11 instead of a liquid crystal display device or an EL display can also be used. That is, as shown in FIG. 2A, the first display unit 11 is placed so as not to cut the line of sight L in front of the second display unit 12, a half mirror 18 is placed across the line of sight from the viewer, and the angle of the half mirror 18 is determined so that an image displayed on the first display unit 11 is superposed on an image displayed on the display unit 12, thus enabling a display device incapable of transmitting light to be used as the first display unit 11.

Referring again to FIG. 1, in this embodiment in particular, the first and second display units 11 and 12 are fixed by the fixing unit 13 in a state where a spacing suitable or most suitable for three dimensional display determined according to the screen sizes of the first and second display units 11 and 12 is set between them, such that the image plane of the first display unit 11 (i.e., the light emitting surface or imaging surface of the first light emitting portion 111) and the image plane of the second display unit 12 (i.e., the light emitting surface or imaging surface of the second light emitting portion 121) can be recognized by the viewer. In other words, the first and second display units 11 and 12 are fixed by the fixing unit 13 while setting a predetermined spacing between them to enable imaging on the image planes of the first and second display units with a suitable or most suitable spacing set between them. Detailed description will be made below of the spacing suitable or most suitable for display of an image having a three-dimensional appearance.

Also, an arrangement in which an imaging unit 20 is placed between the first and second display units 11 and 12 as shown in FIG. 2B may be used. Alternatively, an arrangement in which an optical path length changing unit 21 is placed between the first and second display units 11 and 12 as shown in FIG. 2C may be used. The imaging unit 20 shown in FIG. 2B is provided with a lens, for example. The imaging unit images the image plane of the second display unit 12 at a predetermined position different from the position of the image plane of the second display unit 12 fixed by the fixing unit 13. The optical path length setting unit 21 is, for example, a member made of glass, a resin or the like and having a predetermined refractive index. The optical path length setting unit 21 is used to change the optical path length between the first and second display units 11 and 12.

Referring again to FIG. 1, the fixing unit 13 is provided with a casing or a frame of the display apparatus 1, screws, bolts, a stopper, or the like. The fixing unit 13 connects the first and second display units 11 and 12 to each other so that the first and second display units 11 and 12 are placed along a front-rear direction on the viewer's line of sight.

The image generation unit 14 generates and stores images to be displayed on the first and second display units 11 and 12. Also, images externally supplied, e.g., images prepared with a personal computer or the like may be recorded in a predetermined recording area and read out as required. Unit images can be individually managed and independently processed to be displayed. Images to be displayed can be individually controlled with respect to the display position and size, brightness, hues, displayed forms, image modifications, etc., as well as on which one of the first and second display units 11 and 12 each image is displayed.

The first drive unit 15 and the second drive unit 16 respectively drive the first and second display units 11 and 12 to display images. Each drive unit 15 or 16 drives the first or second display unit 11 or 12 on the basis of an image signal for the first or second display unit 11 or 12 formed by the image generation unit 14. Each of the first and second drive units 15 and 16 may have the function of performing ornamentation-purpose effective drive with respect to display timing, blinking or the like under the control of the control unit 17.

The control unit 17 performs overall control of the display apparatus 1. For display of an image having a three-dimensional appearance, the control unit 17 sets display modes of the first and second display units 11 and 12, e.g., luminances and sizes and makes the image generation unit 14 generate image signals for display on the first and second display units 11 and 12. The control unit 17 also controls the operations of the first and second drive units 15 and 16.

(Computation of the Relationship Between Spacing L and Length S)

Figure 3:
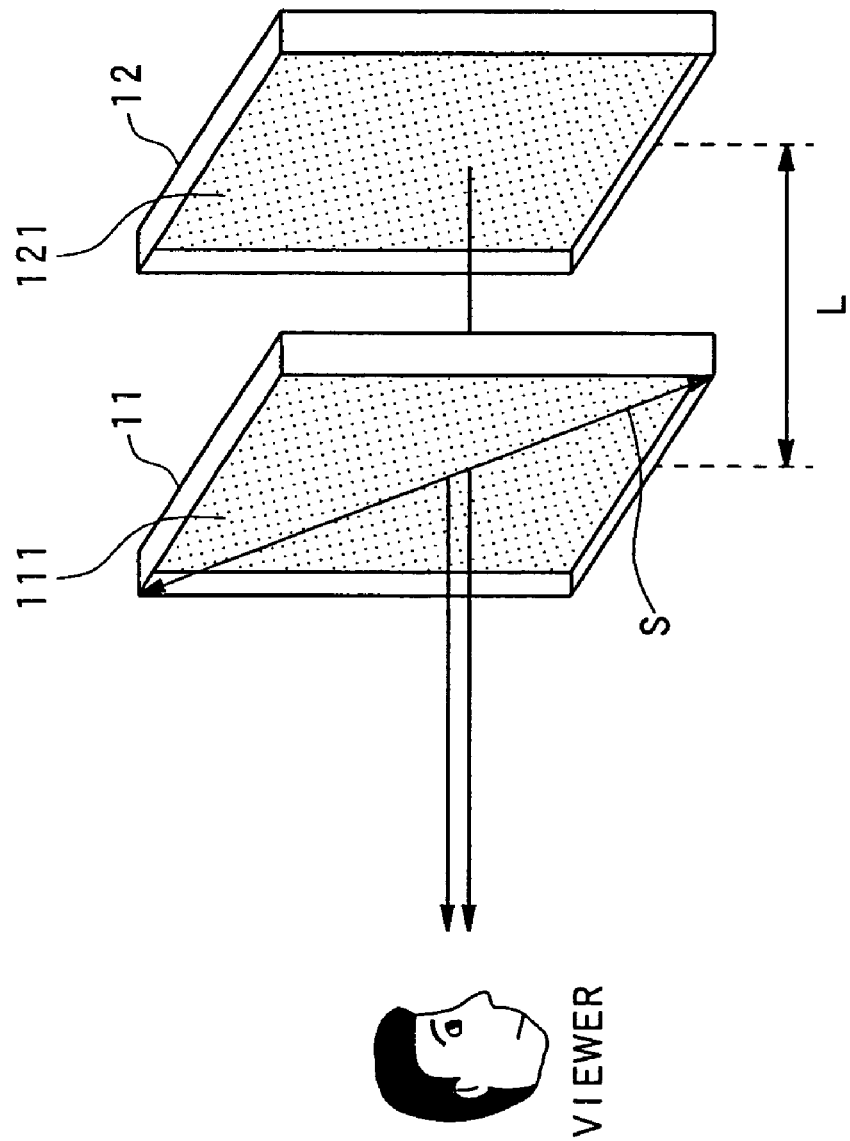
FIG. 3 is a diagram schematically showing the length S of a diagonal line and the spacing L in the display apparatus in the embodiment of the present invention.
Figure 5:
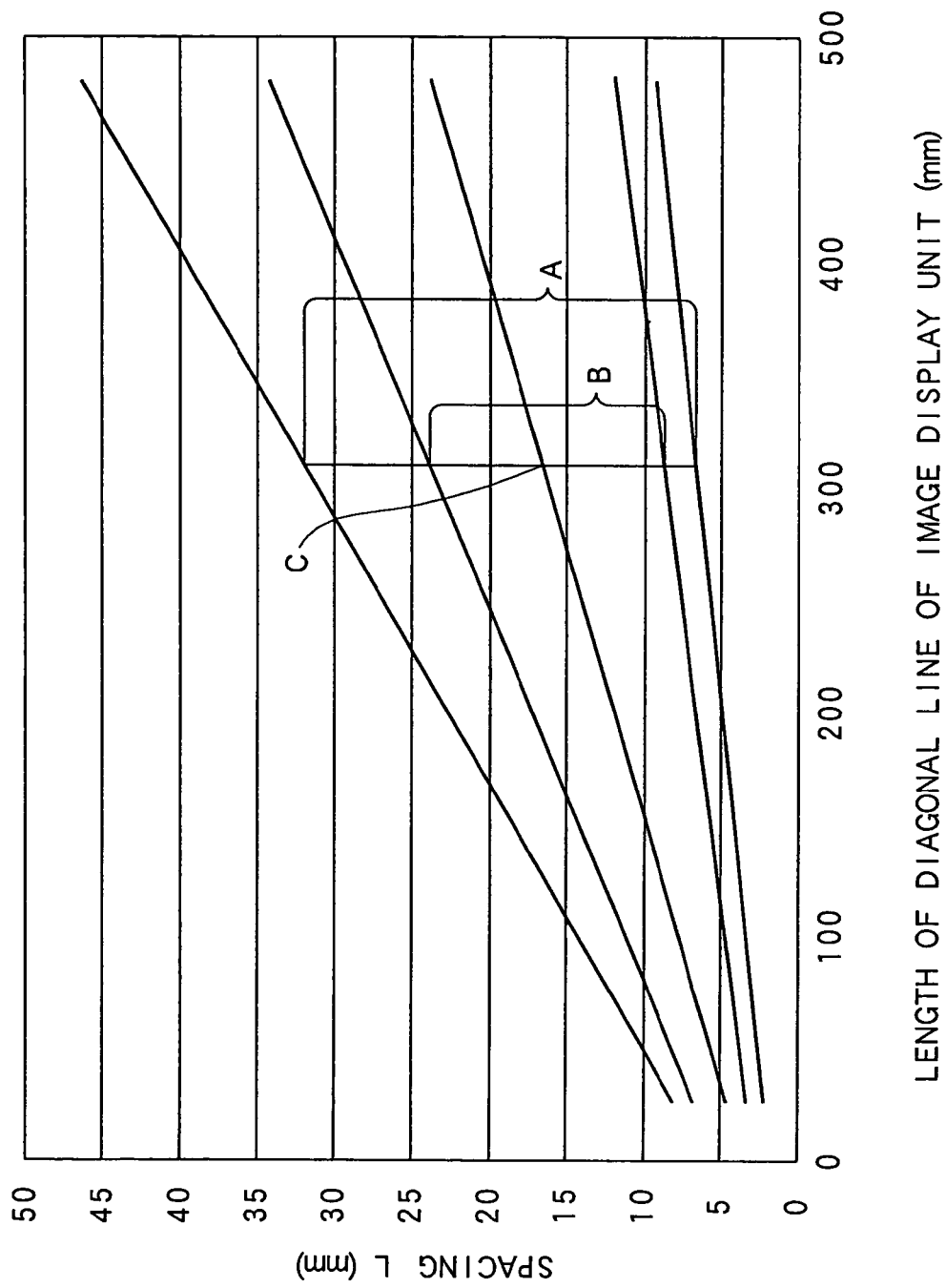
FIG. 5 is a graph showing the relationship between the length S and the spacing L in the display apparatus in the embodiment of the present invention.

The relationship between the spacing L between the image planes of the first and second display units 11 and 12 of the display apparatus 1 and the length S of a diagonal line of the screen of the first display unit 11 (i.e., the light emitting surface of the first light emitting portion 111) in this embodiment of the present invention will be described with reference to FIGS. 3 to 5. FIG. 3 is a diagram schematically showing the spacing L and the length S, FIG. 4 is a table showing the relationship between the spacing L and the length S, and FIG. 5 is a graph showing the relationship between the spacing L and the length S.

As shown in FIG. 3, the first and second display units 11 and 12 are fixed in front and rear positions on the viewer's line of sight by the fixing unit 13 (see FIG. 1). In a case where the viewer directly views the first and second display units 11 and 12 as shown in FIG. 3, the image plane of the first display unit 11 just coincides with the first light emitting portion 111, and the image plane of the second display unit 12 just coincides with the second light emitting portion 121. Accordingly, the spacing L between the image planes of the first and second display units 11 and 12 (hereinafter referred to simply as "spacing L" as occasion demands) is equal to the spacing between the first and second light emitting portions 111 and 121.

In a case where the viewer views the first or second display unit 11 or 12, for example, through a transparent member, a lens or the like having a predetermined refractive index, the spacing L is equal to the spacing between an image plane defined by optically converting the image plane of the first display unit 11 (i.e., the image plane of the first light emitting portion 111) and an image plane defined by optically converting the image plane of the second display unit 12 (i.e., the image plane of the second light emitting portion 121).

The diagonal line length S is the distance between the upper left and lower right corners of the rectangular screen of the first and second display units 11 and 12 expressed in millimeters.

It has been found that if the minimum of the spacing L in a range in which an image having a three-dimensional appearance can be displayed is "lower limit value"; the minimum of the spacing L in a range in which an image having a more preferable three-dimensional appearance is "recommended lower limit value"; a value of the spacing L at which an image having a most or highly suitable three-dimensional appearance is "recommended value"; the maximum of the spacing L in the range in which an image having a more preferable three-dimensional appearance can be displayed is "recommended upper limit value"; and the maximum of the spacing L in the range in which an image having a three-dimensional appearance can be displayed; the relationship shown in FIG. 4 exists between these values in a case where the length of a diagonal line of the screen of the first display unit 11 (i.e., a diagonal line of the screen of the second display unit 12) is discretely increased from 25.4 mm to 508.0 mm, for example (that is, in case where the screen size is increased in 1-inch steps from the 1-inch type to the 20-inch type).

The above-described "lower limit value", "recommended lower limit value", "recommended value", "recommended upper limit value" and "upper limit value" are computed as described below. Each of a plurality of viewers views a three-dimensional image formed by images for three-dimensional viewing formed on the first and second display units 11 and 12 when the spacing between the first and second display units 11 and 12 is gradually changed with respect to each size of the image display units. As the spacing is changed, the contents of the image perceived by each viewer are changed. Therefore, upper limit values, recommended upper limit values, recommended values, recommended lower limit values and lower limit values are extracted according to different viewer's feelings about the three-dimensional appearance.

Criteria of determination of spacing values to be extracted are as described below. A value of the spacing L at which the viewer does not have a sufficient feeling of depth when perceiving the image but can feel a three-dimensional appearance of the image is set as a criterion for "lower limit value". A value of the spacing L at which the viewer can have a sufficient feeling of depth when perceiving the image and can feel a good three-dimensional appearance of the image is set as a criterion for "recommended lower limit value". A value of the spacing L at which the viewer can feel a most or highly suitable three-dimensional appearance of the image when perceiving the image is set as a criterion for "recommended value". A value of the spacing L at which the viewer can perceive an image by suitably superposing images displayed on the first and second display units 11 and 12 and can feel a good three-dimensional appearance of the image is set as a criterion for "recommended upper limit value". A value of the spacing L at which it is difficult for the viewer to perceive an image by suitably superposing images displayed on the first and second display units 11 and 12 but can feel a certain three-dimensional appearance is set as a criterion for "upper limit value".

Spacing values extracted as described above are plotted on a graph with respect to a variable representing the length of the diagonal line of the first display unit 11. Approximation expressions are obtained from line connecting the plotted points, and values shown in the table of FIG. 4 are obtained from the approximation expressions. To obtain approximation expressions, any of various mathematical techniques, e.g., a least-squares method may be used. It is assumed that a linear function is used as each approximate expression in this embodiment. However, a quadratic function or a function of a higher order may alternatively be used.

Condition expressions for specifying conditions for suitable three-dimensional display, determined by computation on the basis of various spacing values extracted as described above, are shown below.

A condition expression for specifying the lower limit value with respect to the spacing L for suitable three-dimensional display is computed as shown by the following expression (4):

$$L=S/63.5+1.5 \qquad (4)$$

A condition expression for specifying the recommended lower limit value with respect to the spacing L for suitable three-dimensional display is computed as shown by the following expression (5):

$$L=S/50.8+2.0 \qquad (5)$$

A condition expression for specifying the recommended value with respect to the spacing L for suitable three-dimensional display is computed as shown by the following expression (6):

$$L=S/25.4+3.5 \qquad (6)$$

A condition expression for specifying the recommended upper limit value with respect to the spacing L for suitable three-dimensional display is computed as shown by the following expression (7):

$$L=(3 \times S)/50.8+5.0 \qquad (7)$$

A condition expression for specifying the upper limit value with respect to the spacing L for suitable three-dimensional display is computed as shown by the following expression (8):

$$L=S/12.7+7.0 \qquad (8)$$

As shown in FIG. 4, in a case where the length of the diagonal line of the screen of the first display unit 11 is, for example, 355.6 mm (that is, in a case where the display unit is a display having a screen size of fourteen inches), the lower limit value is 7.10 mm; the recommended lower limit value is 9.00 mm; the recommended value is 17.50 mm; the recommended upper limit value is 26.00 mm; and the upper limit value is 35.00 mm. That is, if the first and second display units 11 and 12 are fixed in such positions that the spacing L between the image planes of the first and second display units 11 and 12 is within the range from 7.10 to 35.00 mm, the viewer can perceive an image having a three-dimensional appearance. Also, if the first and second display units 11 and 12 are fixed in such positions that the spacing L between the image planes of the first and second display units 11 and 12 is within the range from 9.00 to 26.00 mm, the viewer can perceive an image having a better three-dimensional appearance. Further, if the first and second display units 11 and 12 are fixed in such positions that the spacing L between the image planes of the first and second display units 11 and 12 is 17.50 mm, the viewer can perceive an image having a highly suitable three-dimensional appearance.

FIG. 5 is a graph showing the ranges defined by the condition expressions (4) to (8), the abscissa representing the length of the diagonal line of the first display unit 11, the ordinate representing the spacing L between the first and second display units 11 and 12. Since in this embodiment the condition expressions are obtained as approximation expressions using linear functions as described above, the condition expressions are indicated by straight lines in the graph shown in FIG. 5.

Even in a case where the length S of the diagonal line of the screen of the first display unit 11 is not any of the discrete values shown in FIG. 4 but a value freely selected, e.g., S=317.5 mm (that is, in the case of a display having a screen size of 12.5 inches), the viewer can perceive a three-dimensional image if the first and second display units 11 and 12 are fixed in such positions that the spacing L between the image planes of the first and second display units 11 and 12 is within the range from 6.50 to 32.00 mm (i.e., the range A shown in the graph of FIG. 5). Also, if the first and second display units 11 and 12 are fixed in such positions that the spacing L between the image planes of the first and second display units 11 and 12 is within the range from 8.25 to 23.75 mm (i.e., the range B shown in the graph of FIG. 5), the viewer can perceive an image having a better three-dimensional appearance. Further, if the first and second display units 11 and 12 are fixed in such positions that the spacing between the image planes of the first and second display units 11 and 12 is 16.00 mm (i.e., the point C shown in the graph of FIG. 5), the viewer can perceive an image having a most or highly suitable three-dimensional appearance.

(Concrete Examples of Computation of Spacing)

Figure 6:
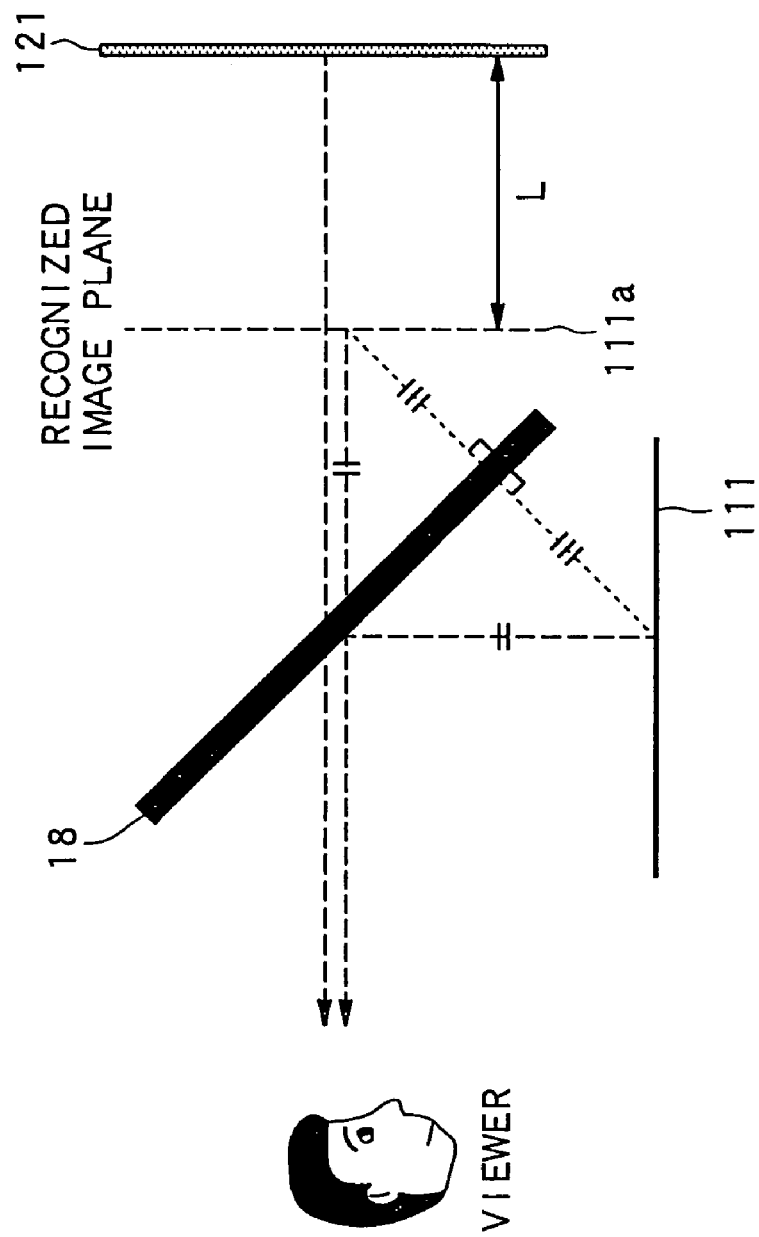
FIG. 6 is a diagram schematically showing the spacing L in another arrangement of the image display units in the embodiment of the present invention.
Figure 8B:
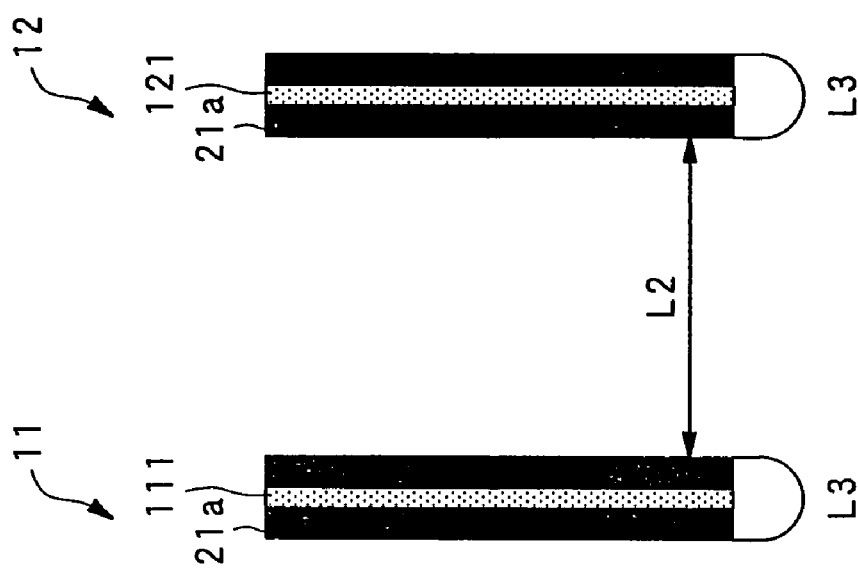
FIG. 8B is a diagram schematically showing the spacing L in other arrangement of the image display units in the embodiment of the present invention.
Figure 8A:
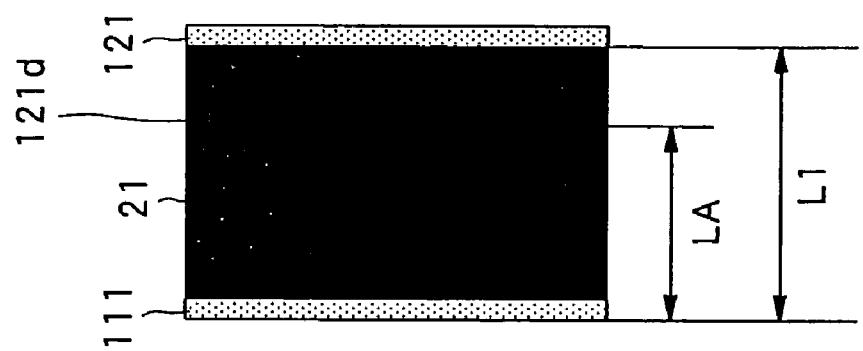
FIG. 8A is a diagram schematically showing the spacing L in other arrangement of the image display units in the embodiment of the present invention.

Concrete examples of the method of computing the spacing L in a case where one of the two image planes of the first and second display units 11 and 12 is imaged at a position different from the actual position of the first display unit 11 or the second display unit 12 will be described with reference to FIGS. 6 to 8. FIG. 6 is a diagram schematically showing a case where the first display unit 11 is combined by a half mirror. FIG. 7A is a diagram schematically showing an example of imaging of the image plane of the second display unit 12 to a position in front of the second display unit 12. FIG. 7B is a diagram schematically showing an example of imaging of the image plane of the second display unit 12 to a position at the rear of the second display unit 12. FIG. 8A is a diagram schematically showing an example of viewer's viewing of the second display unit 12 through a transparent member having a predetermined refractive index. FIG. 8B is a diagram schematically showing an example of a case where the first and second display units 11 and 12 are covered with transparent members having a predetermined refractive index. In these diagrams except FIG. 8B, only the first light emitting portion 111 in the first display unit 11 and only the second light emitting portion 121 in the second display unit 12 are shown by being extracted.

In the example shown in FIG. 6, the display apparatus of this embodiment has a half mirror 18 and is arranged so that light emitted from the first light emitting portion 111 is reflected by the half mirror 18, light emitted from the second light emitting portion 121 passes through the half mirror 18, and the light reflected by the half mirror 18 and the light passing through the half mirror 18 are combined on the viewer's line of sight. More specifically, the half mirror 18 is placed at an angle of forty-five degrees from the viewer's line of sight, and light emitted from the first light emitting portion 111 is incident on the half mirror 18 at an incident angle of forty-five degrees and is reflected by the half mirror 18 at an reflection angle of forty-five degrees to be perceived by the viewer.

The image plane 111a of the first light emitting portion 111 recognized by the viewer is imaged at a position defined by inversion of the first light emitting portion 111 about a reference plane corresponding to the reflecting surface of the half mirror 18. Accordingly, the spacing L between the image plane 111a of the first light emitting portion 111 and the image plane of the second light emitting portion 121 (i.e., the spacing L between the image plane 111a of the first display unit 11 and the image plane of the second display unit 12) is the spacing L between the image plane 111a and the second light emitting portion 121. In other words, the spacing L is equal to the difference between the optical path length from the second light emitting portion 121 to the viewer and the optical path length from the image plane 111a to the viewer.

Since the image plane 111a and the first light emitting portion 111 are in an inverted relationship with each other with respect to the reflecting surface of the total reflecting mirror, the optical path length from the image plane 111a to the reflecting surface of the half mirror 18 and the optical path length from the first light emitting portion 111 to the reflecting surface of the half mirror 18 are equal to each other. Therefore, the spacing L between the image plane 111a of the first display unit 11 and the image plane of the second display unit 12 in this case is computed as the difference between the length of the optical path for light which is emitted from the second light emitting portion 121, passes through the half mirror 18 and thereafter reaches the viewer, and the length of the optical for light which is emitted from the first display unit 11, is reflected by the half mirror 18 and thereafter reaches the viewer.

In the example shown in FIG. 7A, the display apparatus of this embodiment is arranged in such a manner that a lens 20a is placed as the imaging unit 20 between the first light emitting portion 111 and the second light emitting portion 121.

In the case where the viewer views the second light emitting portion 121 through the imaging unit 20, the image plane 121b of the second light emitting portion 121 is imaged at a predetermined position different from the actual position of the second light emitting portion 121. The position at which the image plane 121b is imaged varies depending on the focal length of the lens 20a and the distance between the lens 20a and the second light emitting portion 121. For example, if the focal length of the lens 20a is shorter than the distance between the lens 20a and the second light emitting portion 121, the image plane 121b is imaged in front of the second light emitting portion 121. In this case, the spacing L between the image planes of the first and second display unit 11 and 12 is the spacing L between the first light emitting portion 111 and the image plane 121b of the second light emitting portion 121.

In the example shown in FIG. 7B, the focal length of the lens 20a is set longer than the distance between the lens 20a and the second light emitting portion 121 to image an image plane 121c at the rear of the second light emitting portion 121. In this case, the spacing L between the image planes of the first and second display unit 11 and 12 is the spacing L between the first light emitting portion 111 and the image plane 121c of the second light emitting portion 121. Thus, the spacing between the image planes of the first and second display units 11 and 12 can be changed by adjusting the focal length of the lens 20a so as to satisfy the condition expression (1), (2) or (3).

In the example shown in FIG. 8A, the display apparatus of this embodiment is arranged in such a manner that the optical path length changing unit 21 including a transparent member having a refractive index higher than that of air is placed between the first and second light emitting portions 111 and 121 fixed in a state of having the spacing L between them, the optical path length changing unit 21 being adhered to the first and second light emitting portions 111 and 121;

When the viewer views the second light emitting portion 121 through the optical path length changing unit 21, the image plane 121d of the second light emitting portion 121 is imaged in front relative to the second light emitting portion 121 since the refractive index of the optical path length changing unit 21 is higher than that of air. The image plane 121d is imaged at a position rearwardly spaced apart from the first light emitting portion 111 by the distance represented by the air-conversion optical path length between the first and second light emitting portions 111 and 121. Therefore, the spacing between the image planes of the first and second display units 11 and 12 is computed as the air-conversion optical path length between the first and second light emitting portions 111 and 121. The air-conversion optical path length LA between the first and second light emitting portions 111 and 121 is shown by $LA=L1/n$ if the relative refractive index of the optical path length changing unit 21 relative to that of air is n.

Description will be made of a case where the length of the diagonal line of the screens of the first and second light emitting portions 111 and 121 is 482.6 mm, and where the first and second light emitting portions 111 and 121 are fixed in such positions that the two image planes are imaged with a spacing of the recommended value (22.5 mm obtained from FIG. 4) set between them. For imaging of the two image planes with a spacing of 22.5 mm, setting of the air-conversion optical path length between the first and second light emitting portions 111 and 121 to 22.5 mm suffices. If the refractive index of the optical path changing device 21 is n=1.2, an equation $22.5=L1/1.2$ is established since the air-conversion optical path length is shown by $LA=L1/n$. $L1=27$ mm is thereby computed. That is, if the first and second display units 11 and 12 are fixed in such positions that the first and second light emitting portions 111 and 121 are placed with a spacing of 27 mm set between them, and if a transparent member having a relative refractive index of 1.2 relative to that of air is placed between the first and second light emitting portions 111 and 121, the viewer visually recognizes the image planes of the first and second light emitting portions 111 and 121 in a state of being spaced apart by 22.5 mm. Thus, the viewer can perceive an image having a most or highly suitable three-dimensional appearance.

In the example shown in FIG. 8B, the first light emitting portion 111 constituting the first display unit 11 is covered with protective layers 21a is provided with a transparent member having a predetermined refractive index n and having a thickness of L3, and the second light emitting portion 121 constituting the second display unit 12 is also covered with protective layers 21a is provided with a transparent member having a predetermined refractive index n and having a thickness of L3. Such a form in which the light emitting surface is covered with a protective layer is seen, for example, in EL display devices or the like. In such a case, the first display unit 11 has the first light emitting portion 111 at its center, and the second display unit 12 has the second light emitting portion 121 at its center. The first and second display units 11 and 12 are fixed with a spacing L2 set between them.

The air-conversion optical path length LB between the first and second light emitting portions 111 and 121 is obtained as the sum of the air-conversion optical path lengths in the protective layer portions having the predetermined refractive index and the optical path length in the portion filled with air between the first and second light emitting portions 111 and 121. That is, the air-conversion optical path length LB is computed by LB=(L3/2)/n+L2+(L3/2)/n.

For example, in a case where the length of the diagonal line of the screen of the first and second display units 11 and 12 is 482.6 mm, as in the case shown in FIG. 8A; the thickness of each of the first and second display units 11 and 12 is 1.2 mm; and the refractive index of the protective layer 21a is 1.2, setting of the air-conversion optical path length LB to 22.5 mm suffices and an equation of 22.5=(1.2/2)/1.2+L2+(1.2/2)/1.2 is established from the equation show above for expression of LB. L2=21.5 mm is computed by this equation. That is, the first and second display units 11 and 12 are fixed with a spacing of 21.5 mm set between them to enable the viewer to perceive an image having a most or highly suitable three-dimensional appearance.

In each of the above-described examples of this embodiment, the positional relationship between the two display units is prescribed so that the above-described various condition expressions are satisfied by fixing with the fixing unit. However, the fixing unit may be arranged to fix the two display units so that the two display units can be moved within each of the ranges satisfying the various condition expressions. That is, the fixing unit may be arranged so that at least one of the display units can be moved along the font-rear direction to finely adjust the spacing in the range of spacing suitable or most suitable for three-dimensional display, as described above in the description of this embodiment, and the display units can be fixed in the desired positional relationship after this movement. In such a case, the movement of at least one of the display units or fine adjustment of the position along the font-rear direction may be manually performed or performed by using a mechanical or electric drive device such as a motor.

The present invention is not limited to the above-described modes or implementation or embodiment. Changes or modifications may be made in the modes of implementation and the embodiment as required without departing from the gist or spirit of the present invention readable from the appended claims and the entire specification, any display apparatus involving such changes is also included in the technical spirit of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-365449 filed on Dec. 17, 2002 including the specification, claims, drawings and summary is incorporated herein by reference in its entirety.

What is claimed is:

1. A display apparatus comprising:
   a plurality of display device, at least one of which is a semitransparent display; and
   a fixing device for fixing the plurality of display devices to be placed along a front-rear direction on a viewer's line of sight each other,
   wherein a relationship between the spacing L(mm) between image planes of adjacent of the plurality of display devices and the length S(mm) of diagonal lines of the two display devices satisfies a condition expression:

$$S/63.5+1.5 \leq L \leq S/12.7+7.0 \tag{1}$$

2. The display apparatus according to claim 1, wherein the relationship between the spacing L and the length S satisfies a condition expression:

$$S/50.8+2.0 \leq L \leq (3 \times S)/50.8+5.0 \tag{2}$$

3. The display apparatus according to claim 2, wherein the relationship between the spacing L and the length S satisfies a condition expression:

$$L = S/25.4+3.5 \tag{3}$$

4. The display apparatus according to claim 1, wherein the spacing L is the spacing between light emitting surfaces of the two display devices.

5. The display apparatus according to claim 1, further comprising an imaging device for imaging the image plane of at least one of said two display devices at a predetermined position not located on the screen of said at least one of said two display devices.

6. The display apparatus according to claim 5, wherein at least one of the imaging device comprises a lens.

7. The display apparatus according to claim 6, wherein the lens is provided in correspondence with each of pixels of the two display devices or with each of pixel blocks or pixel lines formed by a plurality of pixels.

8. The display apparatus according to claim 1, wherein the spacing L is an air-conversion optical path length between the two display devices.

9. The display apparatus according to claim 8, further comprising an optical path length changing device for changing the optical path length.

10. The display apparatus according to claim 9, wherein the optical path length changing device comprises a transparent member having a predetermined refractive index.

11. The display apparatus according to claim 10, wherein the transparent member is constituted by at least one of glass or a resin.

12. The display apparatus according to claim 1, wherein one of the two display devices is a display device combined by a half mirror, and the spacing L is the difference between the length of an optical path for light transmitted through the half mirror to reach the other of the two display devices and the length of an optical path for light reflected by the half mirror to reach said one of the two display devices.

13. The display apparatus according to claim 12, wherein the sizes of the screens of the two display devices are equal to each other.

14. The display apparatus according to claim 13, wherein each of the display device except at least the one remotest from the viewer is formed by semitransparent display device.

15. The display apparatus according to claim 14, wherein the semitransparent display device comprises a liquid crystal display device or an electro-luminescent display device.

* * * * *